United States Patent [19]

Allen et al.

[11] Patent Number: 5,293,791
[45] Date of Patent: Mar. 15, 1994

[54] TOOL FOR STRIPPING ELECTRICAL HIGH VOLTAGE CABLE INSULATION

[76] Inventors: Eldon D. Allen, 12 Warren Dr., Little Rock, Ark. 72209; Roy Pennington, Rte. 1, Box 151, Lonoke, Ark. 72086

[21] Appl. No.: 956,657
[22] Filed: Oct. 1, 1992
[51] Int. Cl.⁵ .............................................. H02G 1/12
[52] U.S. Cl. ...................................... 81/9.4; 30/90.4
[58] Field of Search .............. 81/9.4; 30/90.1, 90.4, 30/294, 2

[56] References Cited

U.S. PATENT DOCUMENTS 2,537,237  1/1951  Rosser, Sr. ........................ 30/90.4
4,531,286  7/1985  Vito et al. ............................. 30/2
4,675,996  6/1987  DuBuque ............................. 30/2

*Primary Examiner*—Roscoe V. Parker
*Attorney, Agent, or Firm*—Polster, Lieder, Woodruff & Lucchesi

[57] ABSTRACT

A tool for facilitating removal of electrical high voltage insulation cladding in strips by having cutters positioned in spaced parallel cutting positions, cutter guards adjustably positionable to allow more or less exposure of the cutters to adapt to thickness of the cladding or insulation on the cable, and an element on the handle of the tool for stripping insulation by rolling the cut insulation strip to effect its removal.

6 Claims, 1 Drawing Sheet

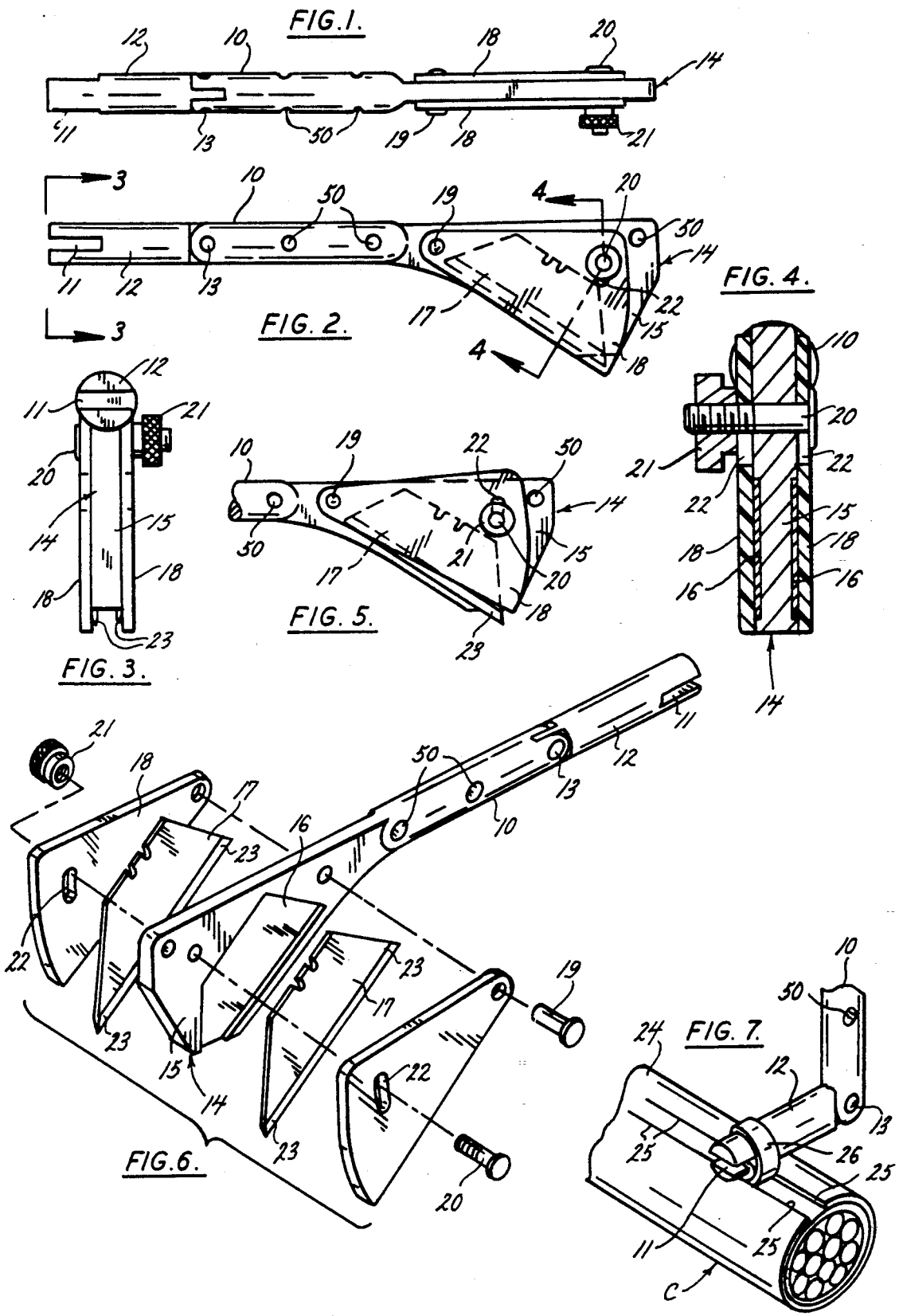

TOOL FOR STRIPPING ELECTRICAL HIGH VOLTAGE CABLE INSULATION

BACKGROUND OF THE INVENTION

1. Field of the Invention

This invention is directed to a tool for scoring the outer insulation of electrical high voltage cables to permit easy stripping of the insulation.

2. Description of the Prior Art

There exists at the present time a problem of removing the diaelectric cladding material from large diameter transmission cables, as this material insulates and forms a magnetic shield. Electricians working with such transmission cables use a pocket knife to cut through the cladding material, and such effort is a time consuming job.

In the handling of high voltage cables there are several known varieties of such cables that have ribbon or tape shielded, drain wire shielded, cablic UniShield ®, concentric neutral (CN), and Jacketed Concentric Neutral (JCN). In certain instances there are common cable configurations which are single conductor or three cable conductor for three-phase systems, or three conductor consisting of three cables sharing a common jacket. However, despite the foregoing visible differences, all high voltage power cables are essentially the same, consisting of the conductor, strand shield, insulation, insulation shield system (semi-con and metallic) and jacket. In order to make a dependable high voltage splice or termination, each component must be understood. The key to good cable preparation is to remove various layers by cuts that extend only partially through the layer. Care needs to be exercised not to cut completely through which could damage the conductor strand or strands.

BRIEF DESCRIPTION OF THE INVENTION

The object of the invention is to provide a simple and effective tool for forming a strip of the outer layer of a cable jacket while being able to adjust the depth of the cut.

A further object is to provide a high voltage cable insulation stripper tool that forms spaced cuts to define the width of the insulation to be stripped, and is also useful for pulling the strip out of the insulation.

Other objects and advantages will be made apparent as the description proceeds in view of the drawing.

BRIEF DESCRIPTION OF THE DRAWING

FIG. 1 is a plan view of the tool;
FIG. 2 is a side elevation of the tool seen in FIG. 1;
FIG. 3 is an end view of the tool taken along line 3—3 in FIG. 2;
FIG. 4 is a sectional view of the tool taken along line 4—4 in FIG. 2;
FIG. 5 is a fragmentary side view of the means for adjusting the knife protective cover;
FIG. 6 is an exploded perspective view of the several components comprising the tool; and
FIG. 7 is a fragmentary perspective view of the use of the tool to convert it to a crank for stripping the insulation cover after performing the cutting of a strip of the cover.

DETAIL DESCRIPTION OF THE EMBODIMENT

Turning to FIGS. 1 and 2 the tool 9 embodies an elongated handle 10 formed at one end with a short element 12 on the handle 10 having an open slot 11 which receives a cut strip and functions as a crank for use in rotating the cut strip on the element 12 to strip a length of cable insulation that has been cut. A suitable pivot element 13 is used to retain the element 12 on the handle. The opposite end or head 14 of the handle 10 presents flattened surfaces 15 on opposite sides of the head (only one being seen). Each side surface 15 is formed with a recess 16 for the reception of a cutting knife 17.

The knives 17, as seen in the exploded view of FIG. 6, are retained in the recesses 16 by guards 18 which cover the knives 17. The guards are pivotally secured on the head 14 of the handle 10 by a pivot pin 19 and by an adjustable pin 20 having a threaded nut 21 engaged on the threaded shaft of the pin 20. The pin 20 extends through an elongated slot 22 which is curved, the center of which curve is in the axis of the pivot pin 19.

In comparing the position of one guard 18 in FIGS. 2 and 5 it can be appreciated that in FIG. 2 the guard 18 is positioned to fully cover the underlying knife 17 by being pivoted about pin 19 after loosening the nut 21. In FIG. 5 the guard 18 is pivoted in a direction to expose a point of the cutting edge 23 on the knife 17. The knives 17 are selectively positionable in the respective recesses 16 so the cutting edges can be repositioned to present different edges.

It is illustrated in FIGS. 3, 4 and 5 that the respective guards 18 can be adjusted to various positions relative to the knives 17 by loosening the nut 21 on the pin 20. Thus more or less of the cutting edges 23 on the knives 17 can be exposed (see FIG. 5) to suite the thickness of the insulation cover 24.

In FIG. 7 there is an example of the utility of the tool 9 in relation to a cable C having an insulation ply 24 that has been cut along the parallel lines 25 by the use of the spaced pair of cutting knife edges 23 on the head 14 which are exposed for that purpose. Each knife 17 is retained in a desired position by the recess 16, while the cover 18 has been adjusted to a desired position in which the cutting edge 23 on both sides is exposed so as not to cut any deeper than the thickness of the ply 24. Once the cuts have been made to the desired length, the end 26 can be lifted sufficiently to permit the slot 11 in the end 12 of the tool handle 10 to be positioned to receive the end 26 of the strip. Thereafter the handle 10 can be pivoted so it is at right angles to the end 12 (as in FIG. 7) for the purpose of cranking the element 12 so the slot will roll or wind up the strip of the insulation on the end 12.

The tool illustrated in the drawings has the advantages of enabling a workman to most efficiently strip electrical high voltage cables to complete needed electrical connections, thereby avoiding laborous hand work to remove cable insulation. Furthermore the tool makes either a single cut at a time by exposing one knife or it can make simultaneous parallel cuts 25 to allow an end tab 26 to be lifted sufficiently for reception in the slot 11 of the element 12 on the handle 10. Once this manipulation of the tool is successfully completed, the handle 10 can be pivoted relative to the element 12 to function as a crank arm for rotating the element 12 to roll the cut strip of the insulation onto the element 12 until a sufficient exposure of the underlying plies is obtained. While the handle 10 may be sufficient to rotate the tool for stripping purposes, it is observed in the drawing at FIGS. 1, 2, 6 and 7 that there are provided openings 50 for the purpose of allowing an auxillary cranking tool to be inserted in the body 10 for rotating the tool for insulation stripping purposes. In the event further plies require stripping, the guards 18 can be readjusted to allow further penetration of the knife cutting edges 23 into underlying plies.

The tool is easy to employ for the rapid stripping of high voltage cable insulation, and it functions to reduce the previous hand stripping activity.

What is claimed is:

1. A tool for facilitating the cutting and stripping of high voltage insulation from an electrical cable to permit splicing with other electrical terminations, the tool comprising:
   a) a body having a headed end and a handle extending from said headed end;
   b) an element pivotally attached to said handle and having a slot formed therein to receive the cut insulation therein;
   c) a cutting element positioned on said headed end of said body, said cutting element having a cutting edge projecting from said headed end in position to cut into the electrical cable insulation; and
   d) cover means carried on said headed end to assume a position over said cutting element whereby said cutting element can be exposed more or less to form a slit in an electrical cable insulation for stripping the insulation.

2. The tool set forth in claim 1 wherein said headed end is formed with a recess sized to position said cutting element in a desired position for cutting into the electrical cable insulation.

3. The tool set forth in claim 2 wherein said cover means retains said cutting element on said headed end in said recess.

4. The tool set forth in claim 3 wherein cover retainer means on said headed end is pivotally adjustable on said head end for permitting more or less extension of said cutting element.

5. The tool set forth in claim 1 wherein said pivotally attached element is angularly positionable relative to said handle for rotating said element to roll the cut insulation up on said element.

6. A tool for removing a strip of high voltage insulation from an electrical cable preparatory to effecting an electrical connection, the tool comprising:
   a) a body having a headed end and a handle extending therefrom; and said headed end having expanded area surfaces formed on opposite sides thereof;
   b) a cutting element positioned on each of said opposite sides, each of said cutting elements having a cutting edge projecting from said surfaces, and said cutting edges being in spaced alignment for effecting simultaneously cuts in the electrical cable insulation;
   c) retainer means carried on said opposite sides of said headed end in position to retain said cutting elements in spaced alignment; and
   d) an insulation cut strip winding element on said body handle for engaging an end of a cut strip of insulation, said winding element having a pivotal connection on said body handle whereby said body handle is movable to a position which affects the winding of the cut strip on said winding element.

* * * * *